E. R. WHITNEY.
MOTOR VEHICLE.
APPLICATION FILED FEB. 26, 1909.
1,065,413.
Patented June 24, 1913.
2 SHEETS—SHEET 2.
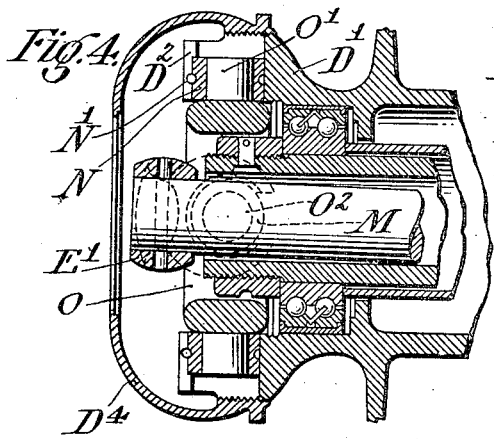
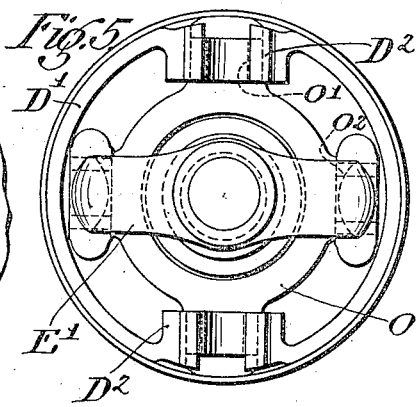
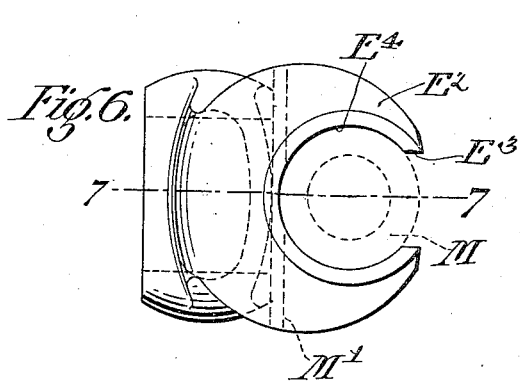
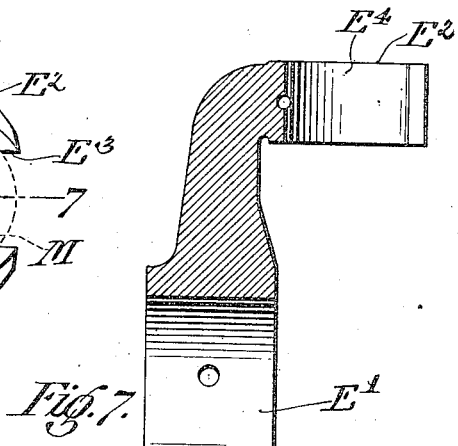
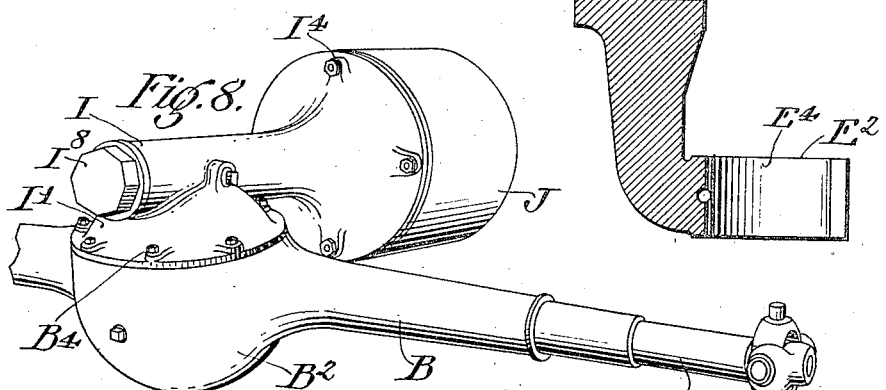

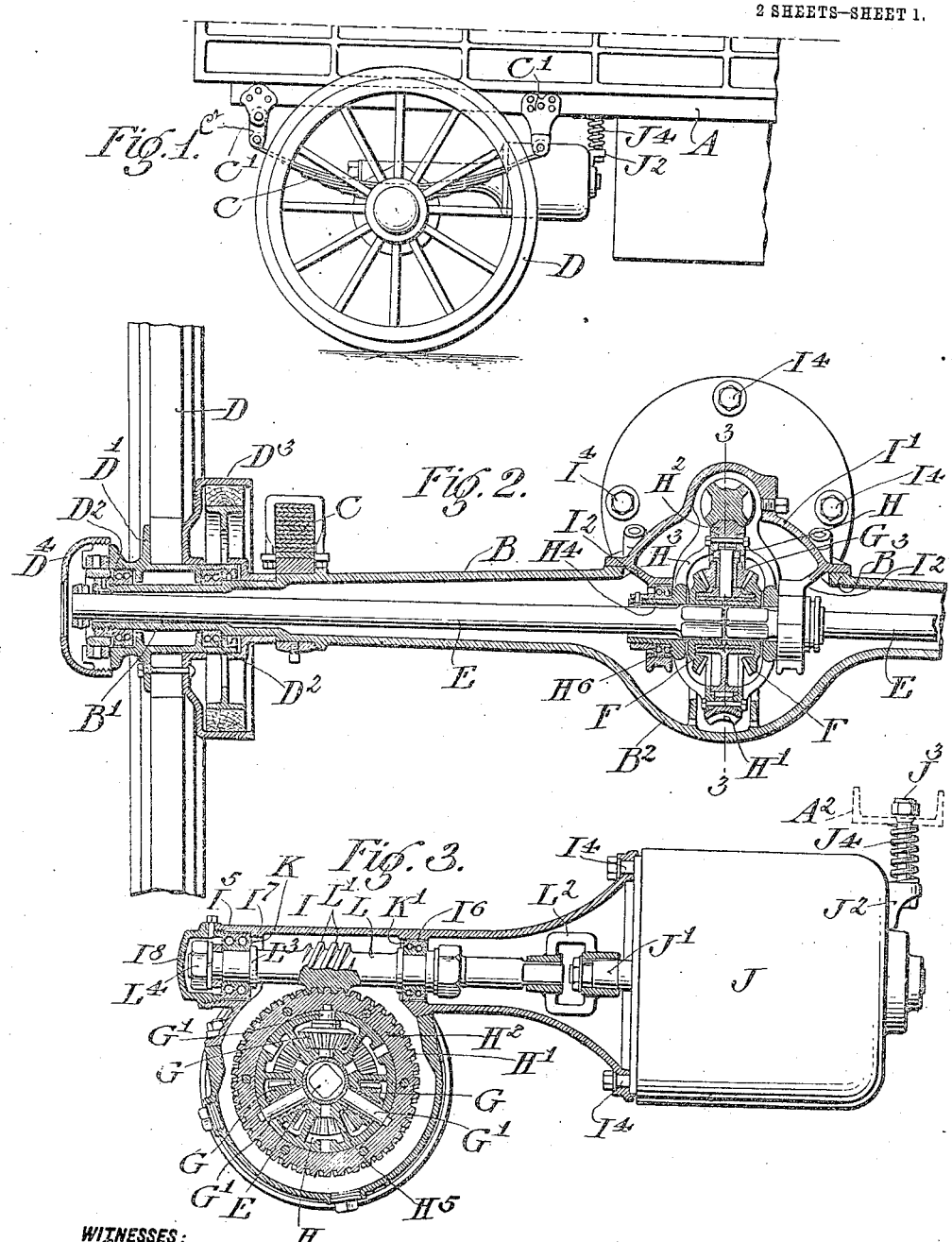

UNITED STATES PATENT OFFICE.

EDDY R. WHITNEY, OF PHILADELPHIA, PENNSYLVANIA, ASSIGNOR TO COMMERCIAL TRUCK COMPANY OF AMERICA, OF PHILADELPHIA, PENNSYLVANIA, A CORPORATION OF PENNSYLVANIA.

MOTOR-VEHICLE.

1,065,413.  Specification of Letters Patent.  Patented June 24, 1913.

Application filed February 26, 1909. Serial No. 480,084.

*To all whom it may concern:*

Be it known that I, EDDY R. WHITNEY, a citizen of the United States of America, residing in the city and county of Philadelphia, in the State of Pennsylvania, have invented certain new and useful Improvements in Motor-Vehicles, of which the following is a true and exact description, reference being had to the accompanying drawings, which form a part thereof.

My present invention relates to motor vehicles, and particularly to the means for supporting and rotating the driving wheels of such vehicles, and the invention consists in numerous novel features in the construction and arrangement of the axle supporting the driving wheels and the means for rotating said wheels, the general purpose of which is to obtain a simple, strong and reliable construction in which the parts can be assembled and disassembled readily when necessary for adjustment or repair.

The various features of novelty which characterize my invention are pointed out with particularity in the claims annexed to and forming a part of this specification. For a better understanding of the invention, however, and the advantages possessed by it, reference may be had to the accompanying drawings and descriptive matter, in which I have illustrated and described one of the forms in which the invention may be embodied.

Of the drawings, Figure 1 is an elevation of a portion of a motor vehicle equipped with my invention. Fig. 2 is a partial longitudinal section through the axle supporting the driving wheels. Fig. 3, is an elevation, partly in section, taken on the line 3—3 of Fig. 2, illustrating the connection between the driving motor and the shafts for rotating the driving wheels. Fig. 4 is a sectional elevation, the view being taken similarly to Fig. 2, but on a larger scale. Fig. 5 is an elevation taken at right angles to Fig. 4. Fig. 6 is a plan view of a portion of the gimbal joint construction shown in Figs. 4 and 5. Fig. 7 is a sectional elevation on the line 7—7 of Fig. 6, and Fig. 8 is a perspective view showing the driving motor and a portion of the axle supporting the driving wheels.

In the construction shown in detail in the drawings, A represents the frame of the motor vehicle, C' the hangers for the ends of semi-elliptical springs C, to the middle portions of which is secured the axle B supporting the driving wheels D. The front ends of the spring C are directly pivoted to the front hangers $C^1$, but the rear ends of the spring C are connected to the rear hangers $C^1$ by links $C^2$. With this arrangement the springs C serve as distance pieces to hold the rear axle against movement relative to the vehicle frame in a direction longitudinal of the latter. As shown, the ends of the axle B are reduced at B'. Surrounding these reduced ends are located ball bearings $D^2$ for the hubs D' of the driving wheels.

$D^3$ represents the usual brake disk attached to the driving wheel.

The axle B is hollow and composed of two hollow and generally conical portions the bases of which are integrally united at the middle of the axle by a globular, enlarged portion $B^2$, within which is located the differential gear through which the driving shafts E are rotated. The shafts E are connected at their outer ends to the wheels D by universal joints hereinafter described in detail. At its inner end each shaft E has connected to it a bevel gear F, the connection being preferably such that the shafts may be moved axially into and out of engagement with the gears F. The two beveled gears F mesh with a series of beveled gears G located between them and journaled on shafts G' which extend radially to the axis of rotation of the shafts E and are mounted in a wheel H comprising a central spider member $H^5$, an annular driving member $H^2$ provided with peripheral teeth H' and spider like members $H^3$ which are secured to the members $H^2$ and $H^5$ and form in effect a cage inclosing the gear wheels F and G. The members $H^3$ are provided with hub portions $H^4$ which loosely surround the shafts E and are journaled by means of ball bearings $H^6$ in bracket like portions $I^2$ depending from a cover member I' which closes an aperture formed in the upper side of the portion $B^2$ of the axle, being secured in place against a seat $B^3$ surrounding said aperture by bolts $B^4$.

The member I' is preferably cast integral with a tubular casing member I provided with seats $I^5$ and $I^6$ for the self-contained ball bearings K and K' mounted on the worm shaft L which drives the wheel H through its spiral ribs or screw threads L', which mesh with the teeth H' of the driving member of the differential gear, said member projecting into the hollow casing I through a lateral opening formed for the purpose in the casing. It will be observed that the ball bearing K is held against axial displacement relative to the member I by a rib I⁵ projecting inwardly from the member I and forming a part of the seat I⁶ and by a cap I⁸ screwed into and closing the adjacent open end of the member I. It will also be observed that the ball bearing K is held against axial movement relative to the shaft L by means of a collar L³ on the shaft L, and the nut L⁴ on the end of the shaft. The bearing K' is held by its seat I⁶ against lateral movement, but not against axial movement in the casing I, and the bearing K' is made smaller in external diameter than the internal diameter of the collar or rib I⁷. This permits the shaft L and bearings K and K' to be moved axially out of the casting I when desired, it being only necessary to remove the cap I⁸ before taking the shaft out. The bearing K thus serves to take up both the end thrust and a part of the side thrust of the shaft L, while the bearing K' takes only side thrust.

The opposite end of the casing I from that to which the cap I⁸ is secured is expanded into a bell shape and is secured, as by bolts I⁴, to the end of the frame of driving motor J, which, in the construction illustrated, is an electric motor. The shaft J' of the motor J has secured to it a coupling member L² between which and the shaft L there is a key and socket connection which prevents relative rotation between the shafts while permitting the shaft L to move freely in an axial direction with respect to the shaft J'. The frame of the motor J is connected to the vehicle body at one side, i. e. at a distance from the axis of the axle, so that the frame of the motor and the casing I form a torsion member for holding the axle B against rotation. In the form shown, the motor frame J is provided at the end remote from the axle with a lug J² through which is passed a bolt J³ which also passes through a bracket A² secured to the motor frame and limits the movement of the motor frame away from the vehicle body. A helical spring J⁴ surrounding the bolt J³ and extending between the bracket A² and the lug J² opposes any movement of the motor frame toward the vehicle frame, while still permitting a certain flexibility in the connection.

At its outer end, each driving shaft E is connected to the hub D' by a universal joint. This joint in the form shown is a gimbal joint, the construction of which is shown clearly in Figs. 4, 5, 6 and 7 of the drawings. To the outer end of each shaft E is secured a yoke member E' having its ends inturned at E² and formed with radially extending cylindrical seats E⁴ for bushings M, which may be locked in place by keys M'. The bushings M when the parts are assembled, surround trunnions O² projecting outwardly at diametrically opposed points from a ring shaped member O. It will be observed that the seats E⁴ are open along the inner sides to permit the trunnions O² to move into and out of place in the bushing seats when the corresponding shaft E is moved axially in the axle, provided the bushings M are not in place in the seats E⁴. The member O is provided with another pair of diametrically opposed trunnions O' which may be moved into and out of place in open sided radial bushing seats D² similar to the seats E⁴ and receiving bushings N similar to the bushings M which are secured in place by pins N'. A cap D⁴ screwed onto a threaded portion of the hub D' serves to inclose and protect the gimbal joint.

With the construction disclosed, it will be observed that each shaft E may be quickly and easily connected to and disconnected from the corresponding wheel D by unscrewing the cap D⁴ and removing bushings N, and that when so disconnected the shaft E may be moved axially out of the axle B and that when the two shafts E are moved, the casing I and cover portion I' may be separated from the axle, and all of the gearing, located within the portion B² of the axle and supported by the portion I' of the casing, may be taken out for inspection, cleaning or repairs. This facility for a rapid and easy assembling and disassembling of the members is very desirable in motor vehicle constructions.

The various parts of the construction shown and described are simple in themselves, and the construction as a whole is reliable and effective. One of the advantages of the construction is found in the fact that the two tubular portions of the axle projecting from the opposite sides of the portion B² need not be in line, but may be slightly inclined to each other as shown to give the set to the wheels, i. e., the inclination of the plane of rotation of each wheel to the plane of rotation of the other which is found desirable in many cases, while at the same time permitting the shafts E to be held in alinement. Moreover, with the arrangement shown this is attained with a construction in which the universal joints are advantageously disposed, and in which but a single shaft section, E, is employed between each wheel and the differential, and without hindering the ready removal of the shafts E or requiring the removal of the vehicle wheels to effect such removal.

While the form of the invention which I have described and illustrated is the best now known to me, it will be obvious to those skilled in the art that some changes in form can be made without departing from the spirit of the invention. It will also be obvious to those skilled in the art, that certain features of my invention can be used without using others.

Having now described my invention, what I claim as new and desire to secure by Letters Patent is;

1. In a motor vehicle the combination with the vehicle frame, of a hollow axle, wheels journaled at the ends thereof, driving shafts for said wheels mounted within the axle, a differential gear to which the inner ends of said shafts are connected, a driving motor comprising a frame and driving shaft, the latter being geared to said differential gear and the motor frame being rigidly connected to the hollow axle, and connections between the vehicle frame and the axle consisting of a pair of leaf springs, one at each end thereof, and each directly connected at one end to the vehicle frame, a link connection between the second end of each spring and the frame, and a yielding connection at one side of the axle between the motor frame and the vehicle frame, whereby said springs serve as distance pieces, and the motor frame as a torsion member, for holding the axle against longitudinal and rotative movements relative to the vehicle frame.

2. In a motor vehicle the combination with the vehicle frame of a hollow axle enlarged at its center and formed with an opening in its enlarged portion, a cover for said opening, a differential gear mounted on said cover and projecting into the enlarged portion of the axle, wheels journaled on the ends of the axle, driving shafts therefor located within the axle and connected to the differential gear, said cover being formed with a lateral hollow extension, a motor comprising a frame and a driving shaft, said motor frame being directly connected to said extension, a shaft journaled in said hollow extension, and directly geared to said differential gear, and directly connected at one end to the shaft of said motor to turn with the latter, and a connection at one side of the axle between the motor frame and the vehicle frame whereby said motor frame and casing serve as a torsion member to hold the axle against rotation.

3. In a motor vehicle, a hollow axle formed with an opening in one side between its ends, a removable cover for said opening, a differential gear located in said hollow axle and supported by and removable with said cover, said differential gear including a toothed driving member, a casing rigidly connected to said cover, a shaft journaled in said casing and extending transversely to the axle, and having teeth meshing with the driving member of said differential gear, and a motor comprising a frame and a rotating shaft, said motor having its frame connected to said casing and its shaft coupled to said first mentioned shaft.

4. In a motor vehicle, a hollow axle, comprising two generally conical portions, the axes of which are inclined to each other and the bases of which are rigidly connected by an enlarged portion open at one side, a motor comprising a frame and a rotating shaft, a casing rigidly connecting said frame and said axle with the shaft of the motor extending transversely to said axle, said casing comprising a portion for closing the opening in said enlarged axle portion, a differential gear located in said enlarged axle portion and supported by said casing, a shaft journaled in said casing and coupled at one end to said motor shaft and having teeth meshing with the teeth of the differential gear, vehicle supporting wheels journaled on the ends of said axle, and driving shafts for said wheels, located in said hollow axle in line with each other and connected, each, at its inner end to the differential gear, and at the other end to the corresponding vehicle supporting wheel.

5. In a motor vehicle, a hollow axle, a differential gear mounted therein, a motor, including a frame and a rotatable shaft, a hollow casing open at one end and rigidly connected at its other end to the motor frame and, adjacent its open end, to said axle, said casing being formed with a lateral opening through which the driving member of the differential gear projects into the casing and being provided with bearing seats at opposite sides of the differential gear, and a worm shaft removable through the open end of the casing and having bearings mounted thereon which seat in said seats, and a key and socket connection between said worm shaft and said rotatable shaft, the seat adjacent the open end of the casing being shaped to hold the bearing seated in it against movement toward the motor while permitting the other bearing to move through it.

6. In a motor vehicle, a hollow axle, a differential gear mounted thereon, a motor including a frame and a rotatable shaft, a hollow casing open at one end and rigidly connected at its other end to the motor frame and, adjacent its open end, to said axle, said casing being formed with a lateral opening through which the driving member of the differential gear projects into the casing and being provided with bearing seats at the opposite sides of the differential gear, a worm shaft, removable through the open end of the casing, having bearings mounted thereon which seat in said seats, a key and socket connection between said worm shaft and said rotatable shaft, the seat adjacent the open end of the casing being shaped to hold the bearing seated in it against movement toward the motor while permitting the other bearing to move through it, and a cap normally closing the open end of the casing and holding the adjacent bearing in its seat.

7. In a motor vehicle, a hollow axle formed between its ends with an opening at one side, a removable cover for said opening, wheel driving shafts located in said axle and a driving connection therefor extending through said opening and comprising a differential gear supported by said cover at its inner side and removable with the cover, and a shaft geared to the driving member of said differential gear and journaled in said cover and extending transversely to, but laterally displaced from said axle.

EDDY R. WHITNEY.

Witnesses:
F. E. WHITNEY,
JOHN J. BRENNER.